United States Patent
Hoogerbrugge et al.

(10) Patent No.: US 10,505,709 B2
(45) Date of Patent: Dec. 10, 2019

(54) WHITE-BOX CRYPTOGRAPHY INTERLEAVED LOOKUP TABLES

(71) Applicant: NXP B.V., Eindhoven (NL)

(72) Inventors: Jan Hoogerbrugge, Eindhoven (NL); Wilhemus Michiels, Eindhoven (NL)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 14/727,413

(22) Filed: Jun. 1, 2015

(65) Prior Publication Data

US 2016/0350560 A1    Dec. 1, 2016

(51) Int. Cl.
G06F 11/30     (2006.01)
G06F 12/14     (2006.01)
H04L 9/00      (2006.01)

(52) U.S. Cl.
CPC ................ *H04L 9/002* (2013.01)

(58) Field of Classification Search
CPC combination set(s) only.
See application file for complete search history.

(56) References Cited

U.S. PATENT DOCUMENTS

| | | | |
|---|---|---|---|
| 2004/0025083 A1* | 2/2004 | Nanja | G06F 11/3684 714/35 |
| 2007/0014394 A1 | 1/2007 | Harder et al. | |
| 2009/0158051 A1* | 6/2009 | Michiels | H04L 9/002 713/189 |
| 2009/0254759 A1* | 10/2009 | Michiels | H04L 9/002 713/189 |
| 2009/0307638 A1* | 12/2009 | McConaghy | G06F 17/5063 716/104 |
| 2009/0313480 A1* | 12/2009 | Michiels | G06F 21/10 713/187 |
| 2010/0054461 A1* | 3/2010 | Ciet | H04L 9/002 380/29 |
| 2010/0296649 A1* | 11/2010 | Katzenbeisser | G06F 21/10 380/28 |
| 2011/0093580 A1* | 4/2011 | Nagasaka | G06F 8/60 709/223 |
| 2012/0002807 A1* | 1/2012 | Michiels | H04L 9/002 380/28 |
| 2012/0042170 A1* | 2/2012 | Curtin | G06F 21/77 713/185 |
| 2012/0093313 A1* | 4/2012 | Michiels | H04L 9/002 380/255 |
| 2012/0159186 A1* | 6/2012 | Farrugia | H04L 9/002 713/189 |

(Continued)

FOREIGN PATENT DOCUMENTS

WO    2010102960    9/2010

OTHER PUBLICATIONS

MathinEnglish.com, According to Wayback Machine, it was posted Aug. 2014.*

(Continued)

*Primary Examiner* — Phy Anh T Vu

(57) ABSTRACT

A method of producing a white-box implementation of a cryptographic function, including: creating, by a processor, a white-box implementation of a cryptographic function using a network of two dimensional lookup tables; identifying two dimensional lookup tables using a common index; and rewriting the identified two dimensional lookup tables as a three dimensional table.

17 Claims, 2 Drawing Sheets

(56) References Cited

U.S. PATENT DOCUMENTS

| | | | | |
|---|---|---|---|---|
| 2014/0380311 | A1* | 12/2014 | Deng | G06F 21/14 718/1 |
| 2015/0172050 | A1* | 6/2015 | Teuwen | H04L 9/0872 380/255 |
| 2015/0186627 | A1* | 7/2015 | Teuwen | G06F 21/14 713/190 |
| 2015/0312223 | A1* | 10/2015 | Michiels | H04L 63/0428 713/168 |

OTHER PUBLICATIONS

"Jong-Yeon Park, Jung-Nyeo Kim, Jae-Dock Lim, Dong-Guk Han, A Whitebox Cryptography Application for Mobile Device Security against Whitebox Attacks—How to Apply WBC on Mobile Device, Oct. 28-30, 2014, IEEE, INSPEC#14882127" (Year: 2014).*

"Joseph Gan, Roddy Kok, Pankaj Kohli, Yun Ding, Benjamin Mah, Using Virtual Machine Protections to Enhance Whitebox Cryptography, May 19, 2015, IEEE, INSPEC#15345738" (Year: 2015).*

"Jong-Yeon Park, Ji-Sun Choi, Okyeon Yi, Methods for practical whitebox cryptography, Nov. 17-19, 2010, IEEE, INSPEC#11705673" (Year: 2010).*

Billet, et al., "Cryptanalysis of a White Box AES Implementation", Selected Areas in Cryptography, vol. 3357 of Lecture Notes in Computer Science,, 227-240.

Cappaert, et al., "An Overview of Control Flow Graph Flattening", K.U. Leuven/ESAT/SCD-COSIC re-trust.dit.unitn.it/files/20081015Doc/session/2-1Cappaert.pdf.

Chow, et al., "A White-Box DES Implementation for DRM Applications", Proceedings of the 2nd ACM Workshop on Digital Rights Management, 1-15, 2002.

Chow, et al., "White-Box Cryptography and an AES Implementation", Cryptography: 9th Annual International Workshop, SAC 2002, St. John's, Newfoundland, Canada, Aug. 15, 2002.

Harder, "Syncrosoft MCFACT—Secure Data Processing Technology", Re-trust Sixth Quarterly Meeting, Mar. 11, 2008, Villach, Austria.

Laszlo, et al., "Obfuscating C++ Programs via Control Flow Flattening", Annales Uni. Sci. Budapest, Sect. Comp. 30 (2009), 3-19.

Michiels, "Opportunities in white-box cryptography.", IEEE Security & Privacy, 8(1), 64-67, 2010.

* cited by examiner

WHITE-BOX CRYPTOGRAPHY INTERLEAVED LOOKUP TABLES

TECHNICAL FIELD

Various exemplary embodiments disclosed herein relate generally to interleaved lookup tables used in white-box cryptography, wherein the interleaved lookup tables increase execution speed.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of producing a white-box implementation of a cryptographic function, including: creating, by a processor, a white-box implementation of a cryptographic function using a network of two dimensional lookup tables; identifying two dimensional lookup tables using a common index; and rewriting the identified two dimensional lookup tables as a three dimensional table.

Various embodiments are described wherein the cryptographic function is an advanced encryption standard function.

Various embodiments are described wherein the cryptographic function is a data encryption standard function.

Various embodiments are described wherein rewriting the identified two dimensional lookup tables as a three dimensional table includes interleaving data in the identified two dimensional lookup tables.

Various embodiments are described wherein the method is a compiler.

Various embodiments are described further including repeating the steps of creating, by a processor, a white-box implementation of a cryptographic function using a network of two dimensional lookup tables, identifying two dimensional lookup tables using a common index, and rewriting the identified two dimensional lookup tables as a three dimensional table until all two dimensional lookup tables using a common index have been identified.

Further embodiments relate to a non-transitory machine-readable storage medium encoded with instructions for producing a white-box implementation of a cryptographic function, the non-transitory machine-readable storage medium including: instructions for creating a white-box implementation of a cryptographic function using a network of two dimensional lookup tables; instructions for identifying two dimensional lookup tables using a common index; and instructions for rewriting the identified two dimensional lookup tables as a three dimensional table.

Various embodiments are described wherein the cryptographic function is an advanced encryption standard function.

Various embodiments are described wherein the cryptographic function is a data encryption standard function.

Various embodiments are described wherein rewriting the identified two dimensional lookup tables as a three dimensional table includes interleaving data in the identified two dimensional lookup tables.

Various embodiments are described wherein instructions for producing a white-box implementation of a cryptographic function are a compiler.

Various embodiments are described further including repeating the instructions for repeating the steps of creating a white-box implementation of a cryptographic function using a network of two dimensional lookup tables, the instructions for identifying two dimensional lookup tables using a common index, and the instructions for rewriting the identified two dimensional lookup tables as a three dimensional table until all two dimensional lookup tables using a common index have been identified.

Further embodiments relate to a device for producing a white-box implementation of a cryptographic function, including: a memory; and a processor in communication with the memory, the processor being configured to: create a white-box implementation of a cryptographic function using a network of two dimensional lookup tables; identify two dimensional lookup tables using a common index; and rewrite the identified two dimensional lookup tables as a three dimensional table.

Various embodiments are described wherein the cryptographic function is an advanced encryption standard function.

Various embodiments are described wherein the cryptographic function is a data encryption standard function.

Various embodiments are described wherein rewriting the identified two dimensional lookup tables as a three dimensional table includes interleaving data in the identified two dimensional lookup tables.

Various embodiments are described wherein the processor is further configured to repeat creating a white-box implementation of a cryptographic function using a network of two dimensional lookup tables, identifying two dimensional lookup tables using a common index, and rewriting the identified two dimensional lookup tables as a three dimensional table until all two dimensional lookup tables using a common index have been identified.

Further embodiments relate to a method of controlling a server that provides an application that implements a white-box implementation of a cryptographic function, including: receiving a request from a user for the application that implements a white-box implementation of a cryptographic function; and providing the user the application that implements a white-box implementation of a cryptographic function, wherein the application was created by creating the white-box implementation of a cryptographic function using a network of two dimensional lookup tables, identifying two dimensional lookup tables using a common index, and rewriting the identified two dimensional lookup tables as a three dimensional table.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
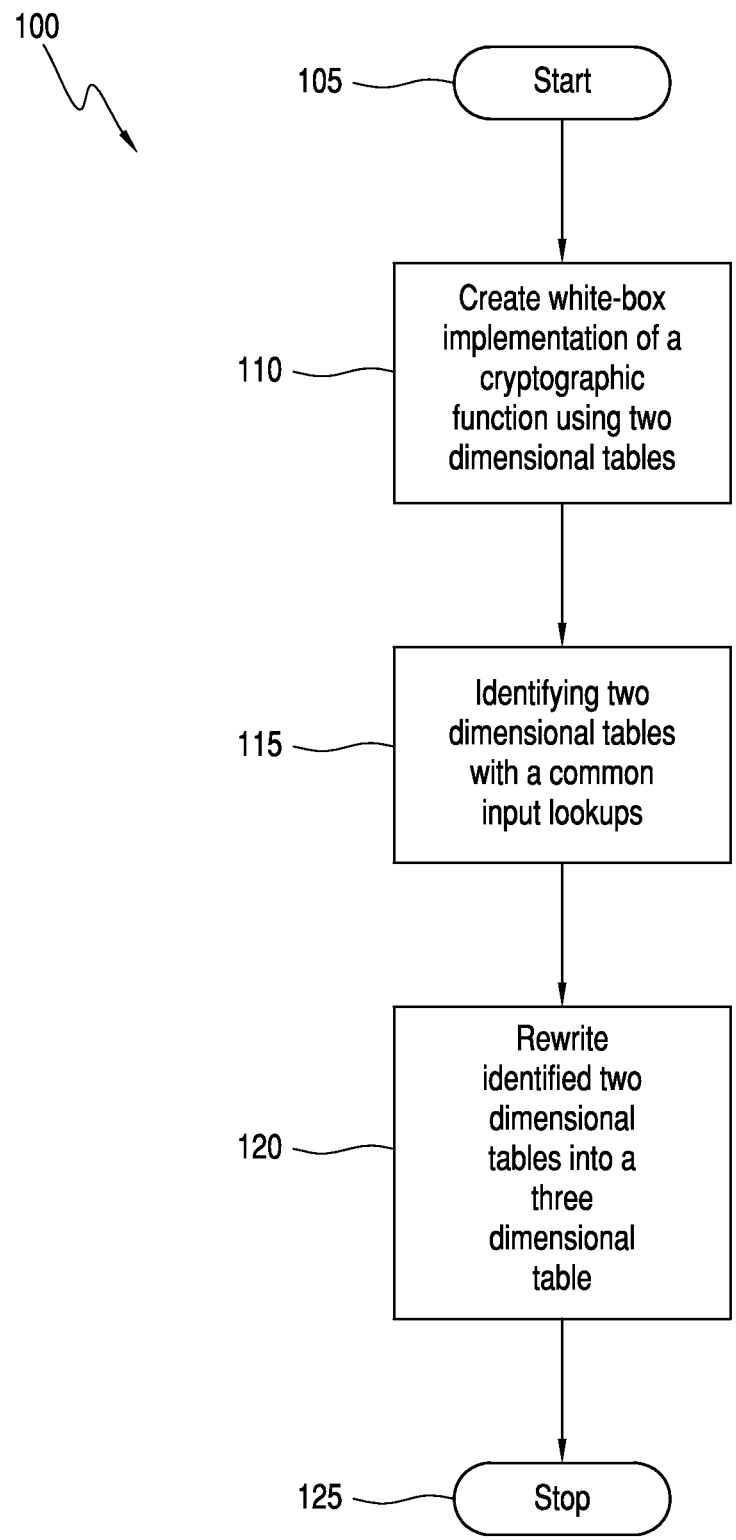
FIG. 1 illustrates a method for improving the execution speed of a table lookup software implementation.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

A table-based approach to a white-box implementation of the Advanced Encryption Standard (AES) and the Data Encryption Standard (DES) was proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well-known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of lookup tables are arranged to compute an output message when they are presented with an input message. Typically, the input message is operated upon by a number of input lookup tables. A number of further lookup tables may take input from one or more of the input lookup tables and/or from the input. Yet further lookup tables can take input in any combination of the input message, the output of input lookup tables and the output of the further lookup tables. Finally some set of exit lookup tables, i.e., at least one, produce as output all or part of the output-message. In this manner a network of lookup tables emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

As described above a white-box implementation may implement a cryptographic function by means of a network of table lookups. For example, these lookup tables may be two dimensional tables of 16 by 16 entries of nibbles (4 bit values). The table receives a byte as an input. A first nibble of the byte is the index in one direction of the two dimensional table, and the second nibble is the index in the other direction. A cryptographic function may include several thousands of those tables on which lookups are performed such that the result of one lookup is used as an index for a successive lookup. The organization of the network of lookup tables and the content of the tables determines the cryptographic function and the secret key that is used by the cryptographic function.

A problem of white-box cryptography using table lookups is slow execution speed compared to an unprotected implementation where no attempt has been made to hide keys. This is due to the large number of table lookups which are accessed without any spatial locality to the data. This results in many data cache misses and therefore slow execution speed. Spatial locality is a type of predictable behavior that occurs in computer systems. Systems that exhibit strong spatial locality are candidates for performance optimization through the use of techniques such as using a cache.

In order to improve the execution speed of the white-box implementation, the white-box implementation may be rewritten such that a set of two dimensional tables that have a common index operand are merged into a three dimensional table and then interleaving the data such that it is very likely that the required data from the set of two dimensional tables will be located in one cache line of the resulting three dimensional table. This improves the spatial locality and therefore performance.

Embodiments implementing three dimensional tables will now be described. An embodiment will be described by means of C code. This could be for example a fragment of a desired white-box implementation of a cryptographic function:

char T1[16][16]={t1_1, t1_2, t1_3, . . . , t1_256};
    char T2[16][16]={t2_1, t2_2, t2_3, . . . , t2_256};
    char T3[16][16]={t3_1, t3_2, t3_3, . . . , t3_256};
    V1=T1[V4][V5];
    V2=T2[V4][V6];
    V3=T3[V4][V7];

In this code T1, T2, and T3 are three 16 by 16 tables. Constants t1_1 . . . t1_256 are the values stored in table T1. Likewise, constants t2_1 . . . t2_256 are the values stored in table T2, and constants t3_1 . . . t3_256 are the values stored in table T3. Values V1, V2, and V3 are output values from tables T1, T2, and T3 respectively based upon index values V4, V5, V6, and V7. The values V4, V5, V6, and V7 may be output from previous tables.

The embodiments described herein makes use of the fact there are many sets of table lookups in the white-box implementation that have a common index. In the example code described above the first index with a value V4 is a common index. As a result the code may be rewritten as:

char T1_3[16][16][3]={{t1_1, t2_1, t3_1}, {t1_2, t2_2, t3_2}, . . . };
    V1=T1_3[V4][V5][0];
    V2=T1_3[V4][V6][1];
    V3=T1_3[V4][V7][2];

The rewrite preserves the functionality but changes how data is stored in memory. After the transformation, the data from the three tables T1, T2, and T3 may be interleaved in the new array T1_3 as shown. Each of the output values V1, V2, and V3 are now determined from the single table T1_3. This may improve the special locality and hence execution performance.

In order to understand why spatial locality is improved, how the addresses that are accessed in memory for the three lookups is evaluated. The addresses for the table lookups associated with evaluating V1, V2, and V3 are:

address(T1_3)+48*V4+3*V5+0;
    address(T1_3)+48*V4+3*V6+1; and
    address(T1_3)+48*V4+3*V7+2.

These address values assume row-major order as used by the C programming language. The three dimensional tables may also be written when column-major ordering is used.

Because V5, V6, and V7 are in the range 0 to 15 and table elements are bytes, the three address locations are at most 47 bytes apart from each other. Because many data caches have cache lines of 32 or 64 bytes it is very likely that 2 or 3 of the three addresses are accessing the same cache line. More lookups accessing the same cache line means that fewer cache lines need to be fetched from memory. This improves the execution speed.

As mentioned earlier, the tables typically store nibble values. This makes it possible to pack two table entries in one byte. This effectively turns 16×16 arrays of nibbles into 16×8 arrays of bytes. This increases the probability that after interleaving the tables, the same cache line will be accessed.

When the common index is the second index in a set of table lookups, these tables may be transposed such that after the transpose the first index becomes the common index. After this the rewrite of the tables may be applied.

The embodiment described above has been implemented in a white-box implementation resulting in an execution time reduction on the order of 30% using application processors of mobile phones.

FIG. 1 illustrates a method for improving the execution speed of a table lookup software implementation. The method 100 begins at 105. Next, the developer of the cryptographic function may create a white-box implementation using two dimensional lookup tables 110. The lookup tables may be obfuscated with input and output encoding as described above to make it harder for an attacker to get the cryptographic key or other secret information used by the white-box implementation. Next, the developer of the cryptographic function analyzes the calls to the lookup tables to identify lookup tables that are executed near one another in time using a common index 115. When these table lookup are near one another in time, it is more likely that the needed values be stored in the cache at the same time after rewriting the tables, thus increasing execution speed. As shown in the embodiments above, three different lookup tables T1, T2, and T3 were each called with V4 as a first index. More or less lookup tables using a common index may be identified. Next, the developer of the cryptographic function may rewrite the identified two dimensional tables into a single three dimensional table 120. The embodiments above show the three tables T1, T2, and T3 being rewritten into the three dimensional table T1_3. The range of the third index will be based upon the number of tables combined. The method may then end 125.

The white-box implementation of the cryptographic function may include hundreds or thousands of lookup tables and associated lookup table calls. As a result the method 100 may be repeated many times to rewrite as many two dimensional tables into the three dimensional tables as needed. Further, the developer of the white-box implementation of the cryptographic function may use computer based tools for generating the white-box implementation. These computer based tools may be expanded to include the method described above for rewriting two dimensional lookup tables into three dimensional lookup tables. These computer based tools may be implemented as software on a computer as described below.

The embodiments described above are directed to a white-box implementation of a cryptographic function. These embodiments may be expanded to include other types of functions implemented using a network of lookup tables. These functions may be functions implemented in software.

The embodiments described herein may be implemented in a complier that compiles a higher order language into machine code for execution on a processor. In this case the compiler converted the higher order language code into a network of lookup tables that then may be further compiled into machine code.

Figure 2:
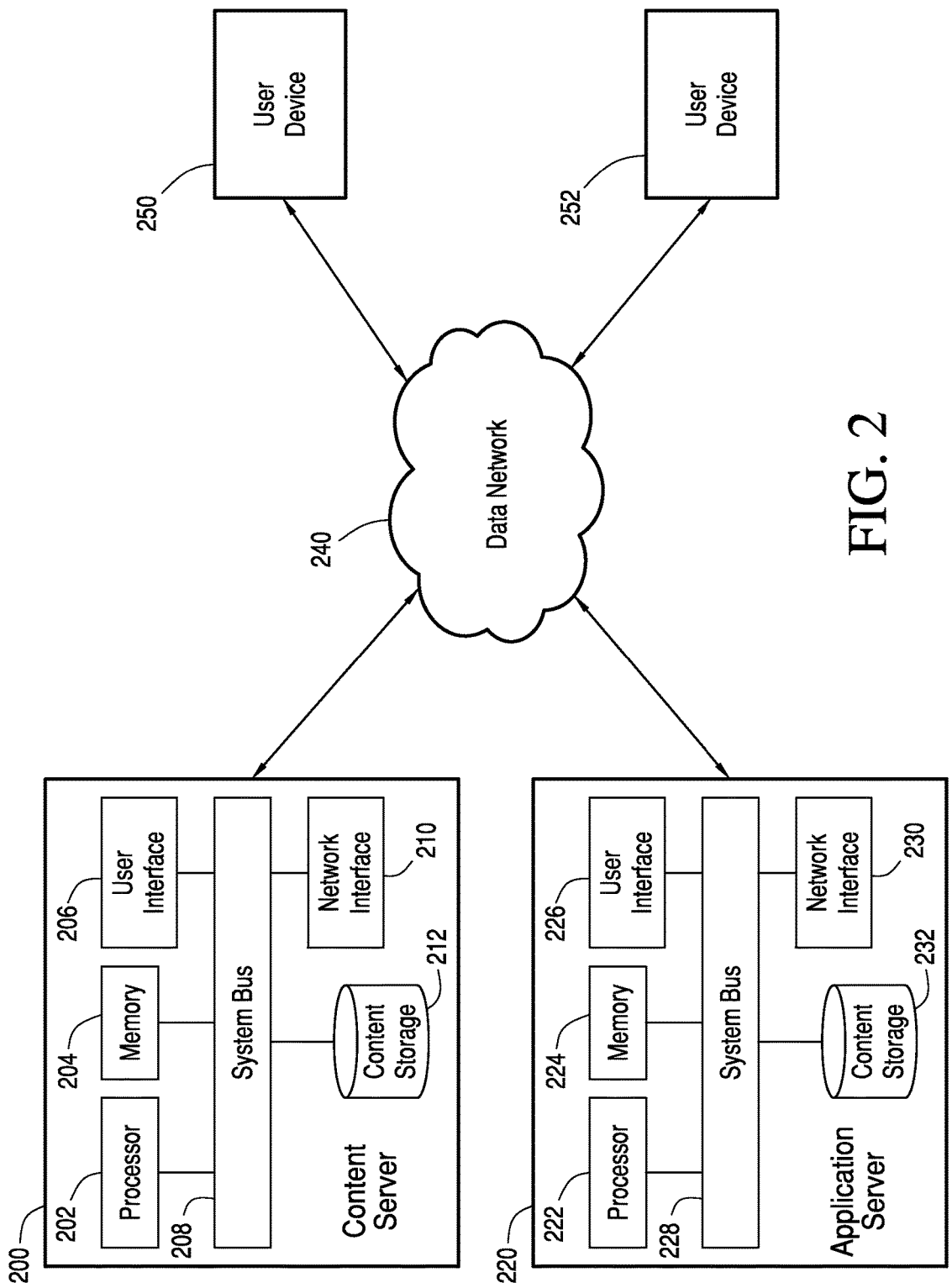
FIG. 2 illustrates a system for providing a user device secure content and a software application that processes the secure content.

FIG. 2 illustrates a system for providing a user device secure content and a software application that processes the secure content. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be modified using the techniques described above to rewrite a number of two dimensional tables as a three dimensional table as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device. Likewise, the application server 220 may control access to the software application provided to the user devices 250, 252. As a result when the content server 200 receives a request for the software application, the application server 220 may transmit the software application to the requesting user device. A user device requesting the software application or secure content may also be authenticated by the respective servers, before providing the software application or secure content to the user device. Alternatively, a user may send a request for secure content directly to the application server which then transmit the software application to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 202 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 212 is replaced by application storage 232. Further, it is noted that the content server and applications server may be implemented on a single server. Also, such servers may be implemented on distributed computer systems as well as on cloud computer systems.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code of a white-box implementation according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium. For example, the method of FIG. 1 may be implemented on a computer system similar to that of the content server 200 or application server 220 of FIG. 2. For example, the method of FIG. 1 may be implemented on a computer system similar to that of the content server 200 or application server 220 of FIG. 2.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of producing a white-box implementation of a cryptographic function, comprising:
   creating, by a processor, the white-box implementation of the cryptographic function using a network of two-dimensional lookup tables;
   identifying a plurality of two-dimensional lookup tables of the same size using a common index;
   rewriting the identified plurality of two-dimensional lookup tables as a three-dimensional table, wherein an added third dimension corresponds to the identified plurality of two-dimensional tables; and
   repeating the steps of creating, by the processor, the white-box implementation of a cryptographic function using a network of two-dimensional tables, identifying a second plurality of two-dimensional lookup tables of the same size using a second common index; and rewriting the identified second plurality of two-dimensional lookup tables as a second three-dimensional table, wherein an added third dimension corresponds to the identified second plurality of two-dimensional tables.

2. The method of claim 1, wherein the cryptographic function is an advanced encryption standard function.

3. The method of claim 1, wherein the cryptographic function is a data encryption standard function.

4. The method of claim 1, wherein the rewriting the identified plurality of two-dimensional lookup tables as a three-dimensional table includes interleaving data in the identified plurality of two-dimensional lookup tables.

5. The method of claim 1, wherein the method is carried out by a compiler.

6. A non-transitory machine-readable storage medium encoded with instructions for producing a white-box implementation of a cryptographic function, the non-transitory machine-readable storage medium comprising:
   instructions for creating the white-box implementation of the cryptographic function using a network of two-dimensional lookup tables;
   instructions for identifying a plurality of two-dimensional lookup tables of the same size using a common index; and
   instructions for rewriting the identified plurality of two-dimensional lookup tables as a three-dimensional table, wherein an added third dimension corresponds to the identified plurality of two-dimensional tables; and
   repeating the instructions for creating the white-box implementation of a cryptographic function using a network of two-dimensional tables, identifying a second plurality of two-dimensional lookup tables of the same size using a second common index; and rewriting the identified second plurality of two-dimensional lookup tables as a second three-dimensional table, wherein an added third dimension corresponds to the identified second plurality of two-dimensional tables.

7. The non-transitory machine-readable storage medium of claim 6, wherein the cryptographic function is an advanced encryption standard function.

8. The non-transitory machine-readable storage medium of claim 6, wherein the cryptographic function is a data encryption standard function.

9. The non-transitory machine-readable storage medium of claim 7, wherein the rewriting the identified plurality of two-dimensional lookup tables as a three-dimensional table includes interleaving data in the identified plurality of two-dimensional lookup tables.

10. The non-transitory machine-readable storage medium of claim 6, wherein the instructions for producing the white-box implementation of the cryptographic function are carried out by a compiler.

11. A device for producing a white-box implementation of a cryptographic function, comprising:
    a memory; and
    a processor in communication with the memory, the processor being configured to:
    create the white-box implementation of the cryptographic function using a network of two-dimensional lookup tables;
    identify a plurality of two-dimensional lookup tables of the same size using a common index;
    rewrite the identified plurality of two-dimensional lookup tables as a three-dimensional table, wherein an added third dimension corresponds to the identified plurality of two-dimensional tables; and
    repeat creating the white-box implementation of a cryptographic function using a network of two-dimensional tables, identifying a second plurality of two-dimensional lookup tables of the same size using a second common index; and rewriting the identified second plurality of two-dimensional lookup tables as a second three-dimensional table, wherein an added third dimension corresponds to the identified second plurality of two-dimensional tables.

12. The device of claim 11, wherein the cryptographic function is an advanced encryption standard function.

13. The device of claim 11, wherein the cryptographic function is a data encryption standard function.

14. The device claim 11, wherein the rewriting the identified plurality of two-dimensional lookup tables as a three-dimensional table includes interleaving data in the identified plurality of two-dimensional lookup tables.

15. A method of controlling a server that provides an application that implements a white-box implementation of a cryptographic function, comprising:

receiving a request from a user for the application that implements the white-box implementation of the cryptographic function; and providing the user the application that implements the white-box implementation of the cryptographic function, wherein the application was created by;

creating the white-box implementation of the cryptographic function using a network of two-dimensional lookup tables, identifying a plurality of two-dimensional lookup tables of the same size using a common index, rewriting the identified plurality of two-dimensional lookup tables as a three-dimensional table, wherein an added third dimension corresponds to the identified plurality of two-dimensional tables; and repeating the steps of creating the white-box implementation of the cryptographic function using a network of two-dimensional tables, identifying a second plurality of two-dimensional lookup tables of the same size using a second common index; and rewriting the identified second plurality of two-dimensional lookup tables as a second three-dimensional table, wherein an added third dimension corresponds to the identified second plurality of two-dimensional tables.

16. The method of claim 15, wherein the cryptographic function is an advanced encryption standard function.

17. The method of claim 15, wherein the cryptographic function is a data encryption standard function.

\* \* \* \* \*